United States Patent
Chang et al.

(10) Patent No.: US 7,797,608 B2
(45) Date of Patent: Sep. 14, 2010

(54) DECODING DEVICE IN OPTICAL DISC DRIVE AND RELATED DECODING METHOD THEREOF

(75) Inventors: Hui-Huang Chang, Hsin-Chu Hsien (TW); Chien-Chih Chen, Hsin-Chu Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 829 days.

(21) Appl. No.: 11/558,927

(22) Filed: Nov. 12, 2006

(65) Prior Publication Data

US 2007/0118789 A1    May 24, 2007

(30) Foreign Application Priority Data

Nov. 24, 2005    (TW) .............................. 94141274 A

(51) Int. Cl.
*H03M 13/00* (2006.01)
(52) U.S. Cl. .................................... 714/755
(58) Field of Classification Search .................. 714/746, 714/755, 761, 763, 769
See application file for complete search history.

(56) References Cited

U.S. PATENT DOCUMENTS 5,696,774 A * 12/1997 Inoue et al. .................. 714/755
5,996,105 A * 11/1999 Zook .......................... 714/755
6,029,266 A *  2/2000 Lee ............................. 714/761
6,158,038 A * 12/2000 Yamawaki et al. .......... 714/755
6,662,335 B1   12/2003 Huang
6,742,156 B2    5/2004 Shieh
6,742,157 B2    5/2004 Shieh
6,772,385 B2    8/2004 Ohyama et al.

FOREIGN PATENT DOCUMENTS

JP    S61-270922 A    12/1986
JP    H11-282703 A    10/1999

* cited by examiner

*Primary Examiner*—Shelly A Chase
(74) *Attorney, Agent, or Firm*—Winston Hsu

(57) ABSTRACT

A decoding device is used to deal with an uncorrected data stored in a data storage device, the uncorrected data containing a inner-code parity (PI) direction error data and a outer-code parity (PO) direction error data, the decoding device including: an error correction unit receiving the uncorrected data and correcting the PO direction error data of the uncorrected data according to a PO direction decoding and correcting information, and then outputting a data; a data buffer for buffering the data, after correcting the PI direction error data of the data, then outputting a corrected data; a PI decoding unit for decoding and correcting the PI error direction error data of the data stored in the data buffer; and a PO decoding unit for generating the PO direction decoding and correcting information to the error correction unit according to the data stored in the data buffer.

19 Claims, 10 Drawing Sheets

DECODING DEVICE IN OPTICAL DISC DRIVE AND RELATED DECODING METHOD THEREOF

BACKGROUND OF THE INVENTION

1. Field of the Invention

This invention relates to an apparatus and a method for data decoding, and more particularly, to a decoding device applied in an optical disc drive and a related decoding method thereof.

2. Description of the Prior Art

Please refer to FIG. 1: FIG. 1 is a block diagram of the conventional DVD playback system 100. As shown in FIG. 1, the DVD playback system 100 includes an EFM+ demodulator 110, a main data storage device 120, a decoding device 130, a decoding result confirmation unit 140, an ATAPI interface unit 150, and a bus 160. The decoding device 130 includes an inner-code parity (PI) syndrome generator 132, a PI error correction unit 134, an outer-code parity (PO) syndrome generator 136, a PO error correction unit 138, and a decoding unit 139. After the playback system 100 reads data from a disc 101 (e.g. a DVD disc), the data will be demodulated by the EFM+ demodulator unit 110 and then stored in the main data storage device 120. The PI syndrome generator 132 reads the data progressively from the main storage device 120 through the bus 160 according to the PI direction (i.e. the horizontal direction) and then generates the PI syndrome. Accordingly, the decoding unit 139 (e.g. the Reed Solomon Product Code (RSPC) decoder) executes the inner-code parity decoding process to the data according to the PI syndrome. According to the decoding result, the PI error address and PI error value generated by the decoding unit 139 are sent to the PI error correction unit 134.

The PI error correction unit 134 then executes the data error correction process to the data by the PI direction, and restores the corrected data into the main storage device 120 through the bus 160. The PO syndrome generator 136 reads the data discontinuously from the main storage device 120 through the bus 160 according to the PO direction (i.e. the vertical direction) and then generates the PO syndrome. Accordingly, the decoding unit 139 executes the outer-code parity decoding process to the data according to the PO syndrome. According to the decoding result, the PO error address and PO error value generated by the decoding unit 139 are sent to the PO error correction unit 138. The PO error correction unit 138 then executes the data error correction process to the data by the PO direction and restores the corrected data into the main storage device 120 through the bus 160. The decoding result confirmation unit 140 (e.g. a descramble and EDC check unit) thus reads data from the main data storage device 120 to check whether the error-correction procedure is completed. If the decoding result confirmation unit 140 determines that the data stored in the main data storage device 120 is correct, the conventional DVD playback system 100 will transfer the data from the main data storage device 120 to a host by means of the ATAPI interface unit 150.

SUMMARY OF THE INVENTION

It is therefore one of the many objectives of the claimed invention to provide a decoding device to improve memory usage efficiency and a related decoding method thereof.

According to an aspect of the present invention, a decoding device is disclosed. The decoding device is utilized for processing an uncorrected data in a data storage medium. The uncorrected data comprises a first direction error data and a second direction error data. The decoding device comprises: an error correction unit receiving the uncorrected data, for correcting the second direction error data of the uncorrected data according to a second direction decoding information and outputting a data; a data buffer, coupled to the error correction unit, for buffering the data and outputting a corrected data after the first direction error data of the data is corrected; a first decoding unit, coupled to the data buffer, for decoding and correcting the first direction error data of the data stored in the data buffer; and a second decoding unit, coupled to the data buffer and the error correction unit, for generating the second direction decoding information to the error correction unit according to the data stored in the data buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
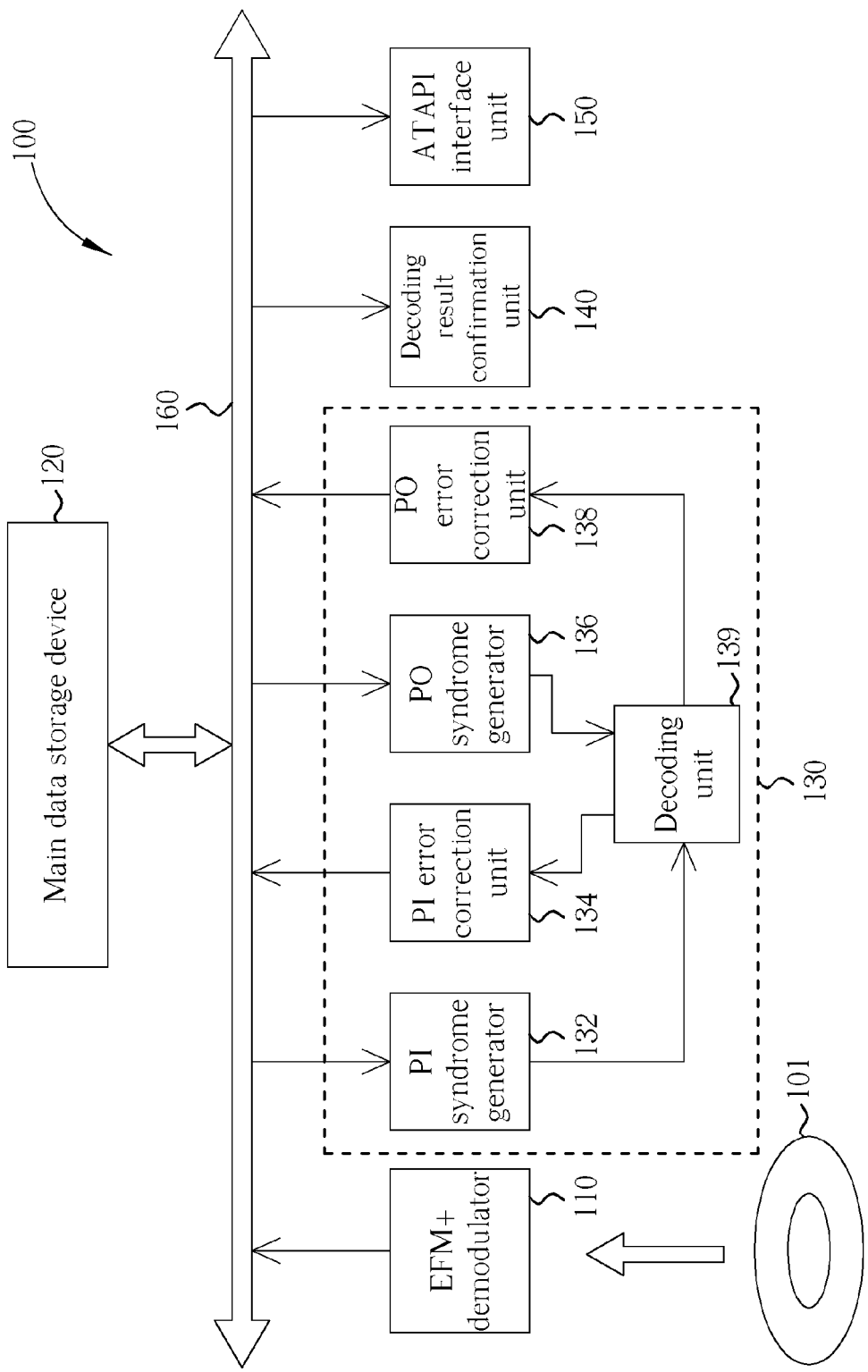
FIG. 1 is a block diagram of the conventional DVD playback system.
Figure 2:
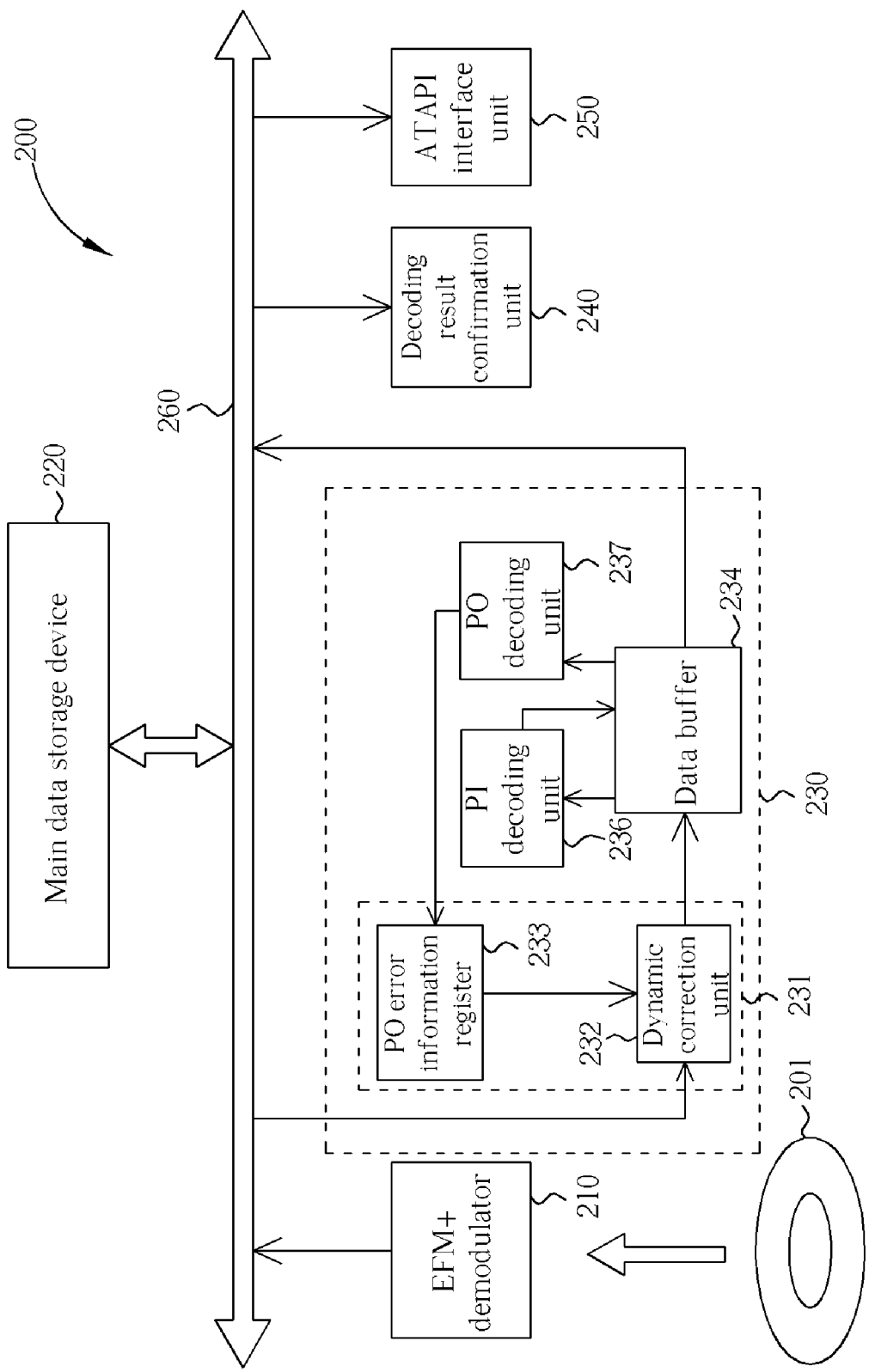
FIG. 2 is a block diagram of the DVD playback system having a decoding device according to the first embodiment of the present invention.

Please refer to FIG. 2: FIG. 2 is a block diagram of the DVD playback system 200 including a decoding device 230 according to the first embodiment of the present invention. As shown in FIG. 2, the playback system 200 includes an EFM+ demodulator 210, a main data storage device 220 (e.g. Dynamic Random Access Memory), a decoding device 230, a decoding result confirmation unit 240, an ATAPI interface unit 250, and a bus 260. The decoding device 230 includes an error correction unit 231, a data buffer 234, a PI decoding unit 236, and a PO decoding unit 237. The error correction unit 231 includes a PO error information register 233 and a dynamic correction unit 232. At first, the decoding device 230 reads the data from the main data storage device 220 to the error correction unit 231. Since this is the first time to read the data, the error information register 233 does not have any PO-relative error information and error address. The data will therefore be directly sent to the data buffer 234. Next, the decoding device 230 reads the data progressively from the main data storage device 220 according to the PI direction. The data read by the decoding device 230 is continuous data; the main storage device 220 thus avoids the additional burden of discontinuous data reading.

The PI decoding unit 236 decodes and corrects the data stored in the data buffer 234 in sequence according to the PI direction, and generates the PI direction error value and error address. The PI direction error value and error address are then utilized to process a logic calculation (normally an XOR calculation) with the data corresponding to the error address. The correct data generated from the calculation is rewritten into the data buffer 234 to finish the operation of the PI direction error correction. The PI corrected data is then written into the main data storage device 220. Additionally, the PO decoding unit 237 decodes the data stored in the data buffer 234 according to the PO direction to generate the PO direction error value and error address, and then sends the PO direction error value and error address to the PO error information register 233 of the error correction unit 231. In the next accessing, the decoding device 230 reads the data in sequence according to the PI direction from the main data storage device 220, and sends the data into the error correction unit 231. At this moment, since the error information register 233 already contains the PO error information and error address, the dynamic correction unit 232 is able to correct the data according to the PO direction and write the corrected data into the main data storage device 220. The decoding result confirmation unit 240 reads data from the main data storage device 220 and checks if the operation of error correction is completed. Finally the ATAPI interface unit 250 sends the corrected data from the main data storage device 220 to a host in order to execute the following data processing schedule.

In this preferred embodiment, the data buffer 234 is utilized for registering and buffering the data from the error correction unit 231 and for PI direction decoding and PO direction decoding. With the assistance of the error correction unit 231, the data stored in the data buffer 234 can finally be rewritten in sequence into the main data storage device 220. Please note that, in this moment; the data buffer 234 writes the whole data (including the error corrected data, the data with indeterminable errors, and the originally correct data) into the main data storage device 220 in sequence. Thus, the decoding device 230 in the present invention does not need to write the corrected data randomly into the main storage device 220 as in the related art. Therefore the decoding device 230 in the present invention reduces the bandwidth and access time of the main data storage device 220 and increases the data access efficiency of the main data storage device 220.

Figure 3:
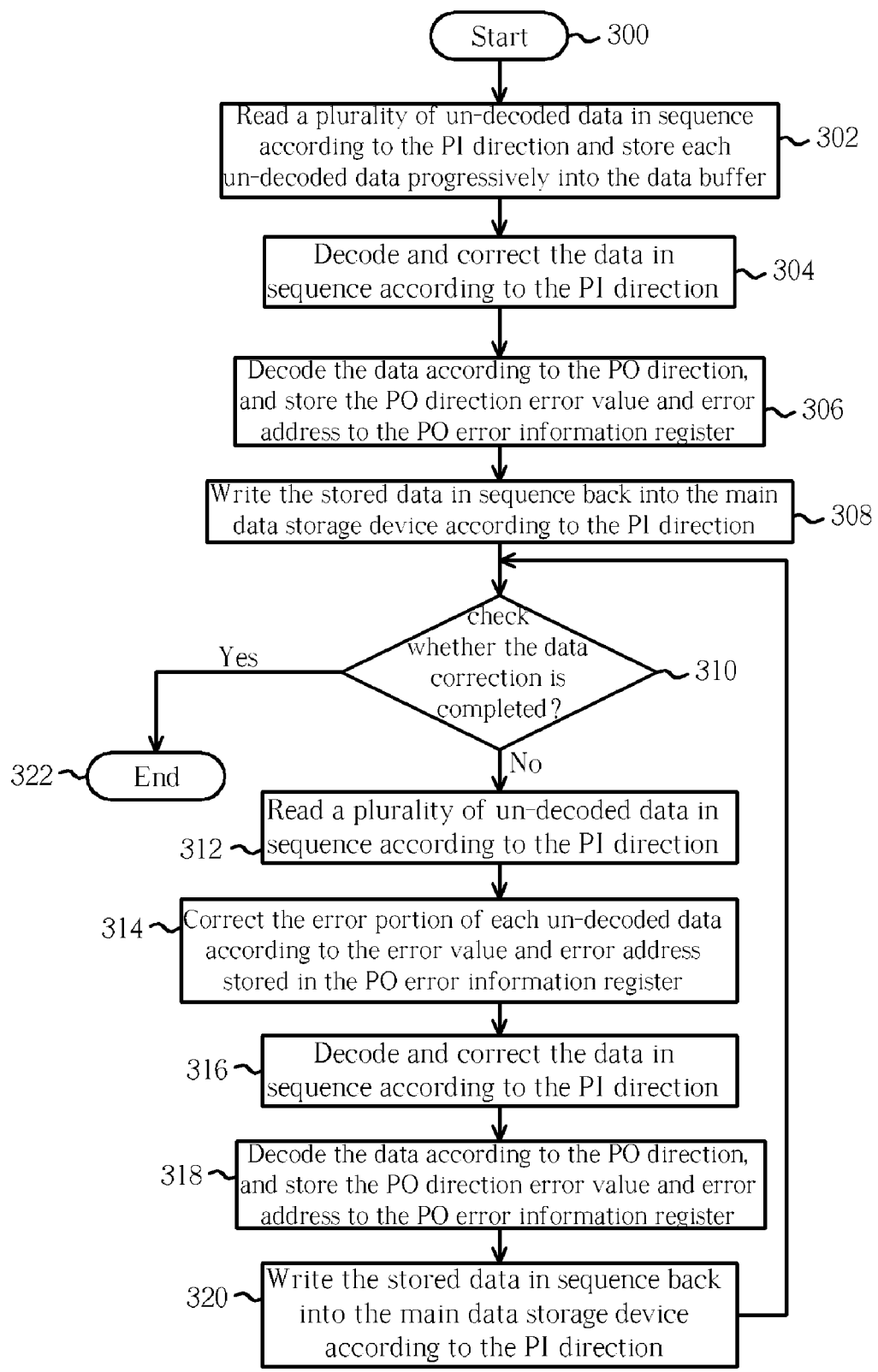
FIG. 3 shows a flowchart illustrating the data decoding and error correction operation of the decoding device shown in FIG. 2.

Please refer to FIG. 3. Please refer to FIG. 3: FIG. 3 shows a flowchart illustrating the data decoding and error correction operation of the decoding device 230 shown in FIG. 2. Related steps shown in the flow chart do not necessarily need to be sequentially executed; other steps may be inserted between the present steps. In general, however, the results are the same. The processes of data decoding and error correction are detailed in the following:

Step 300: Start.

Step 302: The decoding device 230 reads a plurality of un-decoded data from the main data storage device 220 in sequence according to the PI direction, and stores each un-decoded data progressively into the data buffer 234.

Step 304: The PI decoding unit 236 decodes the data stored in the data buffer 234 in sequence according to the PI direction, utilizes the decoded PI direction error value and error address to process a logic calculation (normally an XOR calculation) with the data corresponding to the error address, and rewrites the calculated data into the data buffer 234 to finish the PI direction error correction process.

Step 306: The PO decoding unit 237 decodes the data stored in the data buffer 234 according to the PO direction, generates the PO direction error value and error address and registers the PO direction error value and error address to the PO error information register 233.

Step 308: The data buffer 234 writes its registered data in sequence back into the main data storage device 220 according to the PI direction.

Step 310: The decoding device 240 determines whether the data correction is completed and correct by checking the data stored in the data storage device 220. If the correction is completed, the process goes to step 312.

Step 312: The decoding device 230 reads a plurality of un-decoded data from the main data storage device 220 in sequence according to the PI direction.

Step 314: The dynamic correction unit 232 processes each un-decoded data progressively, corrects the error portion of each un-decoded data according to the error value and error address stored in the PO error information register 233, and then writes the processed un-decoded data into the data buffer 234.

Step 316: The PI decoding unit 236 decodes the data stored in the data buffer 234 in sequence according to the PI direction, utilizes the decoded PI direction error value and error address to process a logic calculation (normally an XOR calculation) with the data corresponding to the error address, and rewrites the calculated data into the data buffer 234 to finish the PI direction error correction process.

Step 318: The PO decoding unit 237 decodes the data stored in the data buffer 234 according to the PO direction, generates the PO direction error value and error address, and registers the PO direction error value and error address to the PO error information register 233.

Step 320: The data buffer 234 writes the stored data into the main data storage device 220 in sequence according to the PI direction, and then goes back to step 310.

Step 322: End.

Figure 4:
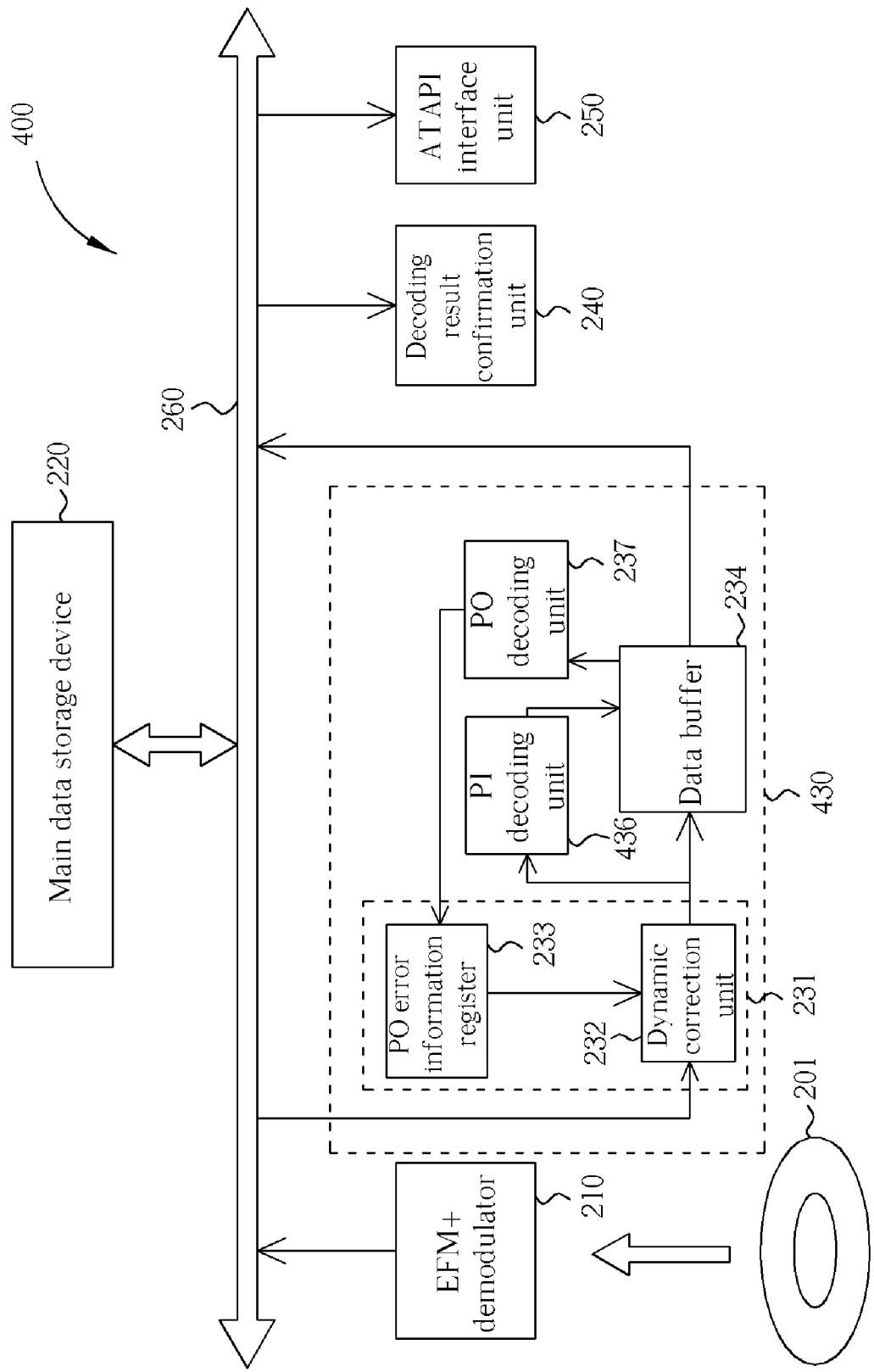
FIG. 4 is a block diagram of the DVD playback system having a decoding device according to the second embodiment of the present invention.
Figure 5:
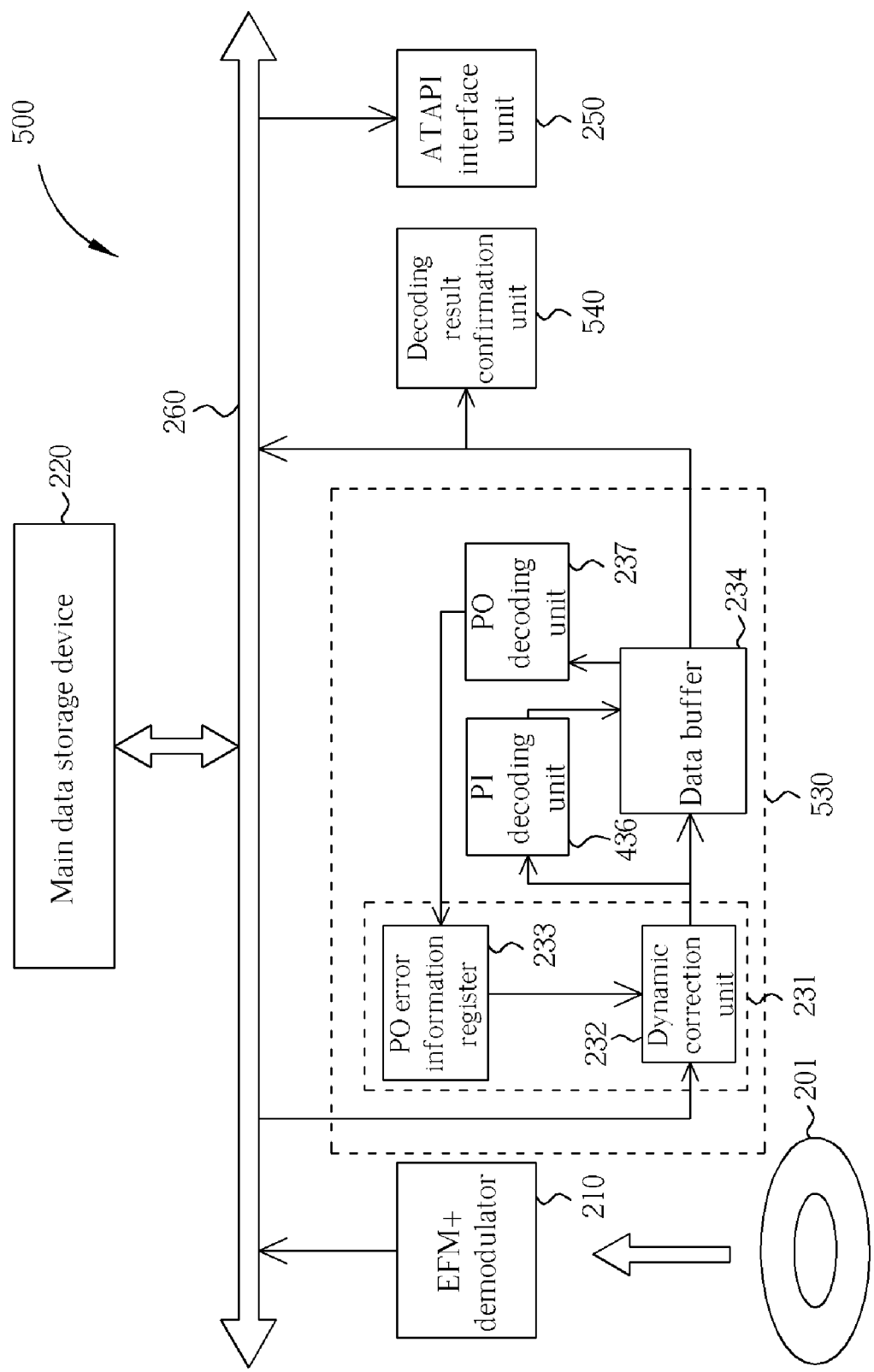
FIG. 5 is a block diagram of the DVD playback system having a decoding device according to the third embodiment of the present invention.

Please refer to FIG. 4 and FIG. 5: FIG. 4 is a block diagram of the DVD playback system 400 including a decoding device 430 according to the second embodiment of the present invention; FIG. 5 is a block diagram of the DVD playback system 500 including a decoding device 530 according to the third embodiment of the present invention. Please note that, since the same name elements of the DVD playback system 200, 400 and 500 shown in FIG. 2, FIG. 4 and FIG. 5 have the same function and operation, detailed description is omitted for the sake of brevity. The difference between the DVD playback system 400 as shown in FIG. 4 and the DVD playback system 200 as shown in FIG. 2 is that the PI decoding unit 436 of the decoding device 430 directly receives each un-decoded data from the main data storage device 220, and processes the operation of decoding and correcting the data according to the PI direction and error correction. After decoding and correcting, the corrected data will be sent into the data buffer 234. In contrast to the DVD playback system 200, the DVD playback system 400 therefore reduces the data access frequency and lowers the bandwidth requirement for the data buffer 234. Moreover, the difference between the DVD playback system 500 shown in FIG. 5 and the DVD playback system 400 shown in FIG. 4 is that the decoding result confirmation unit 540 is directly coupled to the data buffer 234. Therefore, when the data stored in the data buffer 234 (already processed by the decoding device 530) is rewritten into the main data storage device 220, the decoding result confirmation unit 540 is able to receive the data stored in the data buffer 234 simultaneously and to determine whether the error correction process is completed. In other words, the decoding result confirmation unit 540 does not need to read the data rewritten by the data buffer 234 from the main data storage device 220 through the bus 260. Accordingly, the DVD playback system can greatly reduce the data access frequency, as well as the bandwidth consumption, of the main data storage device 220.

In the embodiments detailed above, the data buffer 234 writes the whole stored data (including the error corrected data, the data with indeterminable error, and the originally correct data) into the main data storage device 220 in sequence. If only a few data have errors (i.e. most of the data in the main data storage device 220 are correct), only the corrected data need to be rewritten into the main data storage device 220 in order to reduce the required memory bandwidth. In this situation, the present invention further provides a data rewritten mechanism to determine whether to write the whole data in sequence or to only write the corrected data back to the main data storage device 220 according to different data error quantities.

Figure 6:
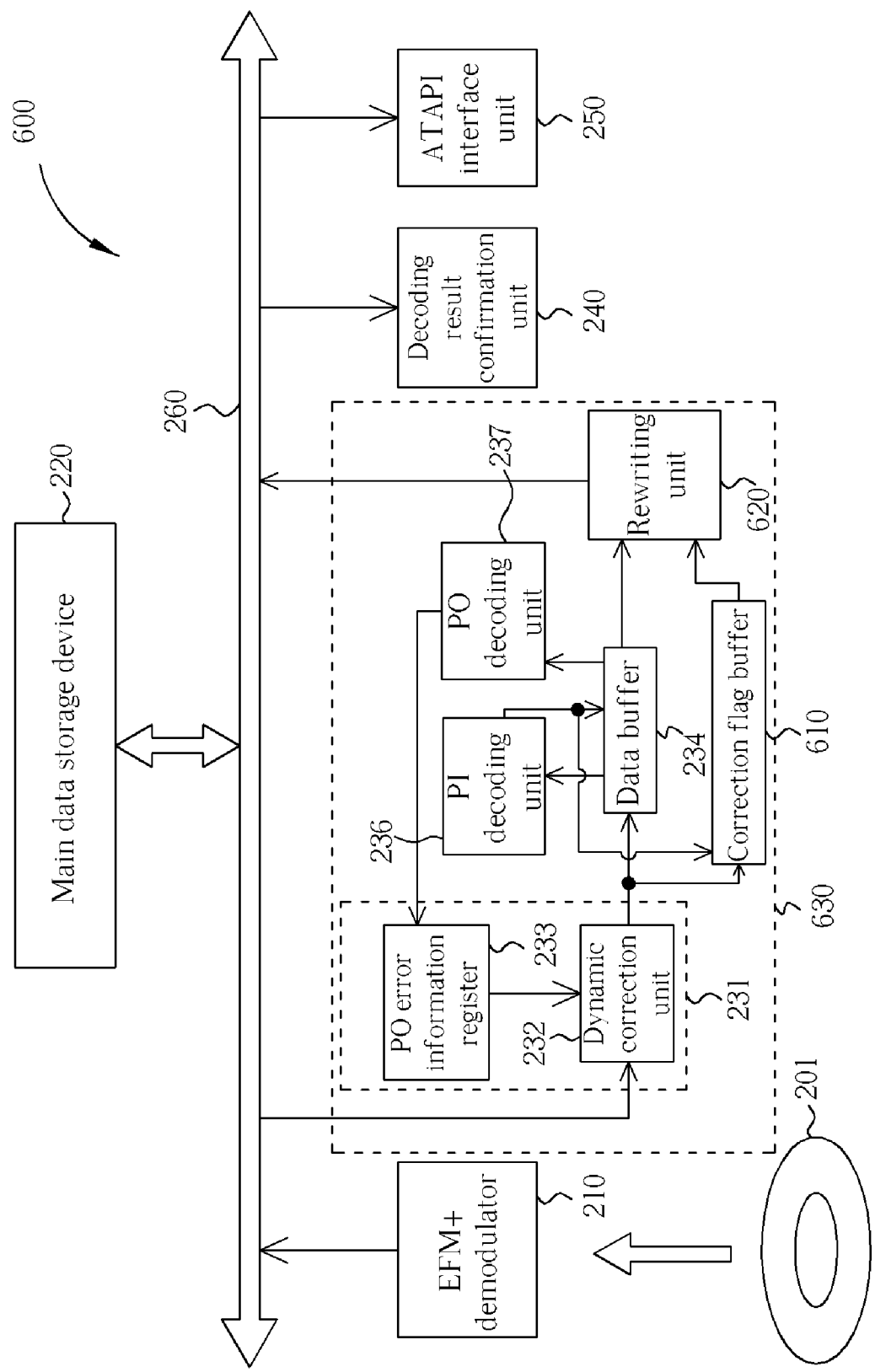
FIG. 6 is a block diagram of the DVD playback system having a decoding device according to the fourth embodiment of the present invention.

Please refer to FIG. 6: FIG. 6 is a block diagram of the DVD playback system 600 including a decoding device 630 according to the fourth embodiment of the present invention. Please note that, since the same name elements of the DVD playback system 200 and 600 shown in FIG. 2 and FIG. 6 have the same function and operation, detailed description is omitted for the sake of brevity. In contrast to the DVD playback system 200 shown in FIG. 2, the DVD playback system 600 additionally sets a correction flag buffer 610 and a rewriting unit 620. When the PI decoding unit 236 processes the operation of the PI direction error correction to the data inputted into the decoding device 630, the PI decoding unit 236 sets an error correction flag stored in the correction flag buffer 610 according to the location of the corrected data. That is, when the dynamic correction unit 232 processes the error correction operation to the data inputted into the decoding device 630, the dynamic correction unit 232 also sets an error correction flag stored in the correction flag buffer 610 according to the location of the corrected data. In other words, the error correction flag is utilized for indicating a data section stored in the data buffer 234 that has been error corrected.

The size of the data section can be adjusted according to design requirements. For example, each error correction flag (1 bit) can mark the data with one byte to recognize if the data is error corrected. Thus, for each data corresponding to the PI direction (e.g. the PI codeword is 182 bytes in length), the correction flag buffer 610 stores 128 error correction flags. That is, when the number "n" byte of the data is error corrected, the number "n" error correction flag of the 128 error correction flags then will be marked as a first flag value (e.g. the logical value "1"). When the number n+1 byte of the data corresponding to the PI direction is not error corrected, the number n+1 error correction flag of the 128 error correction flags will therefore be marked with another flag value (e.g. the logical value "0"). Furthermore, in order to reduce the required memory capacity of the error flag buffer, the length of each data section corresponding to the error correction flag can be determined according to the hardware structure of the main data storage device 220. For example, the main data storage device can access 32 bits (4 bytes) in each clock cycle, and therefore one error correction flag (1 bit) can mark the data with 4 bytes to recognize if the data is error corrected. Finally, the rewriting unit 620 can determine the data rewriting mechanism according to the error correction flag recorded in the correction flag buffer 610. If the quantity of error data is more than a threshold value, meaning the error data is too much, the rewriting unit 620 can write the whole data stored in the data buffer 234 back to the main data storage device 220 according to the rewriting mechanism of the above embodiments. If the quantity of error data is less than the threshold value, however, the rewriting unit 620 can, as in the conventional method, randomly write the data section, which is error corrected and stored in the data buffer 234, back to the main data storage device 220 according to the error correction flag in the correction flag buffer 610.

Figure 7:
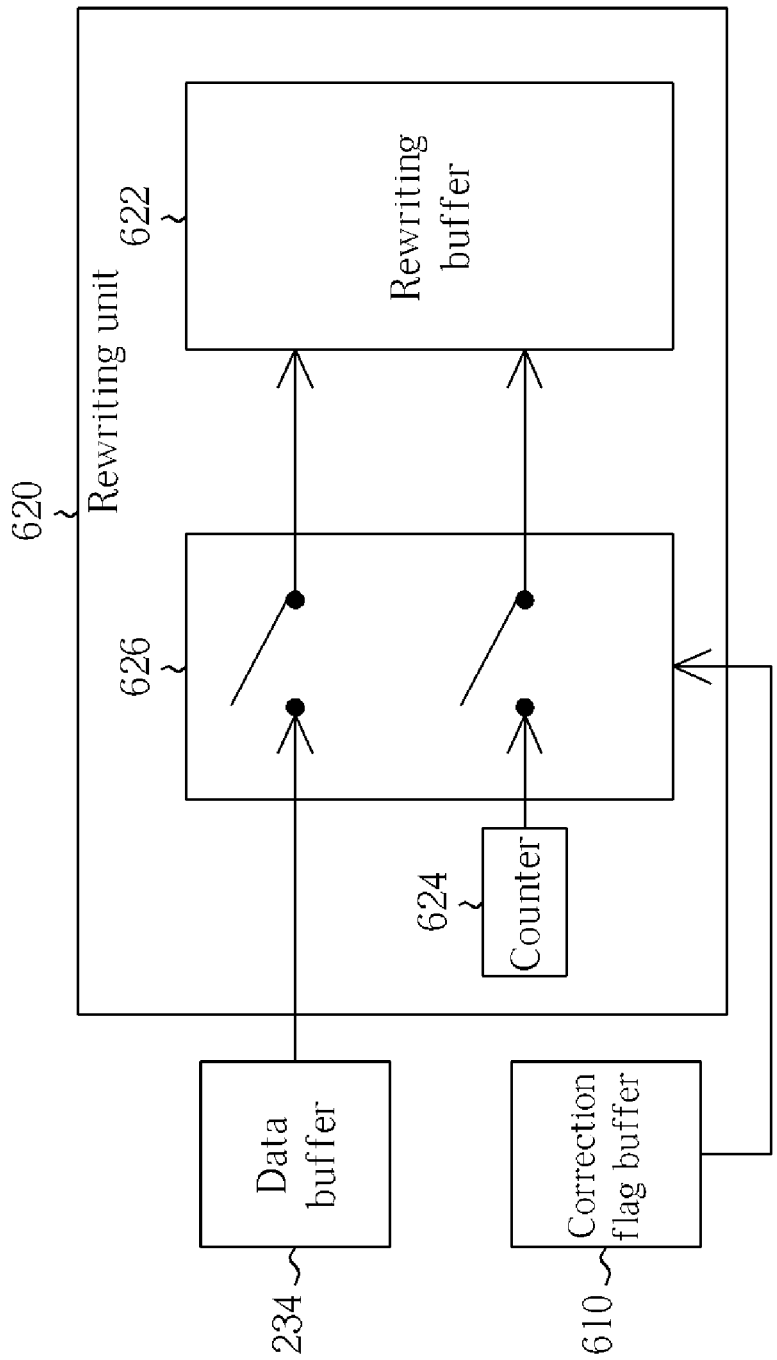
FIG. 7 is a block diagram of the first embodiment of the rewriting unit shown in FIG. 6.

Please refer to FIG. 7: FIG. 7 is a block diagram of the first embodiment of the rewriting unit 620 shown in FIG. 6. As shown in FIG. 7, the rewriting unit 620 includes a rewriting buffer 622, a counter 624, and a switch module 626. The rewriting buffer 622 is utilized to store the data section (at least including the corrected data) and the related address information, which is ready to be rewritten to the main data storage device 220. The switch module 626 determines whether to couple the data buffer 234 and the counter 624 to the rewriting buffer 622 according to each error correction flag in the correction flag buffer 610. That is, the error correction flag is utilized as an enable signal for the switch module 626. The counter 624 is utilized to count each un-decoded unit of an un-decoded data corresponding to the PI direction stored in the data buffer 234 to generate an address value. For instance, for a PI codeword, the counter 624 counts each symbol of the PI codeword to generate the corresponding address value. Thus when an error correction flag, which indicates the location of error correction, enables the switch module 626, the address value outputted from the counter 624 and the corresponding data section stored in the data buffer 234 are written back into the rewriting module 622 altogether.

Figure 8:
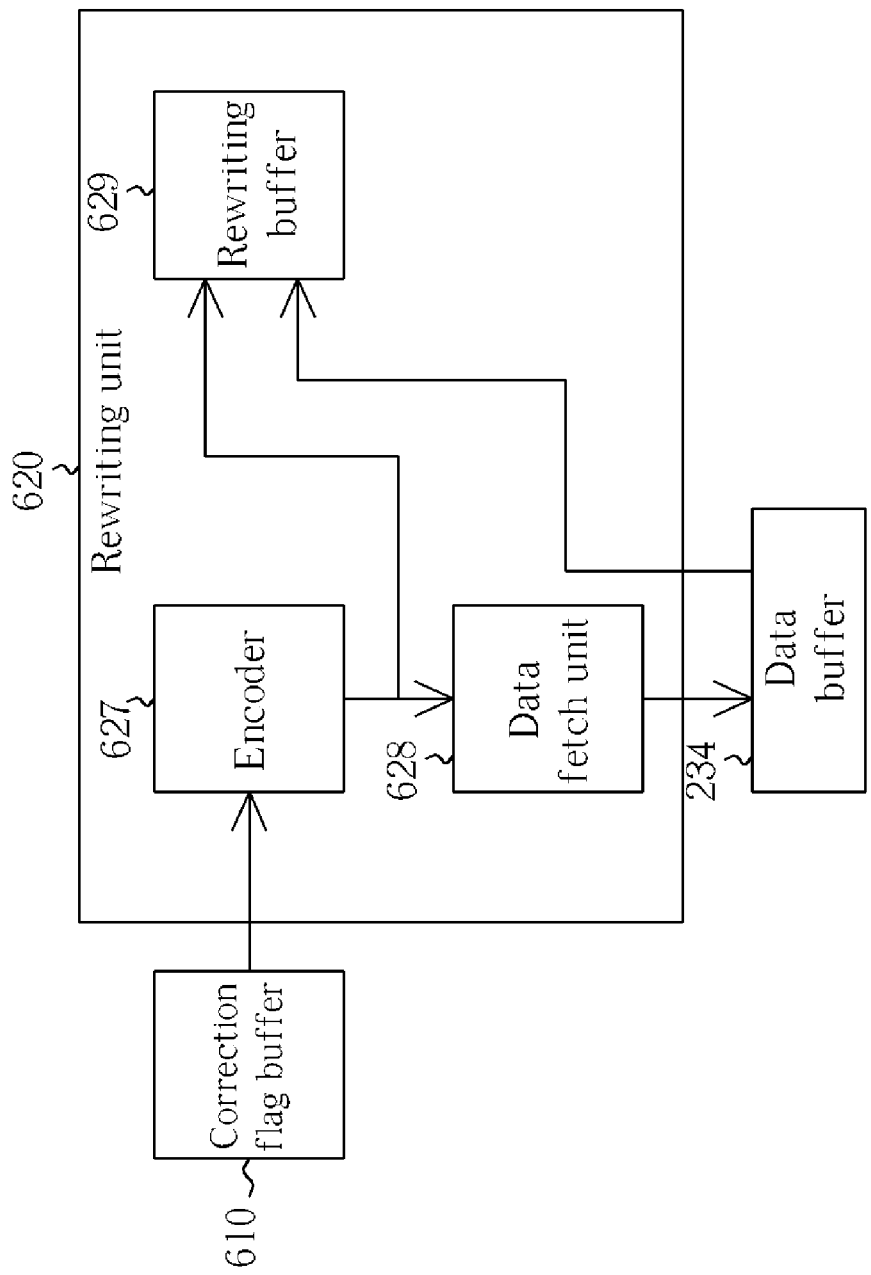
FIG. 8 is a block diagram of the second embodiment of the rewriting unit shown in FIG. 6.

Please refer to FIG. 8: FIG. 8 is a block diagram of the second embodiment of the rewriting unit 620 shown in FIG. 6. As shown in FIG. 8, the rewriting unit 620 includes an encoder 627, a data fetch unit 628 and a rewriting buffer 629. The rewriting buffer 629 is utilized to store the data section (at least including the corrected data) and the related address information, which is ready to be rewritten to the main data storage device 220. The encoder 627 directly encodes each error correction flag of the correction flag buffer 610 to generate the address information corresponding to a data section, writes the address information of the data section into the rewriting buffer 629, and sends the address information to the data fetch unit 628. The data fetch unit 628 can thus acquire the data section from the data buffer 234 according to the address information of the data section outputted by the encoder 627, and write the data section back to the rewriting buffer 629.

Figure 9:
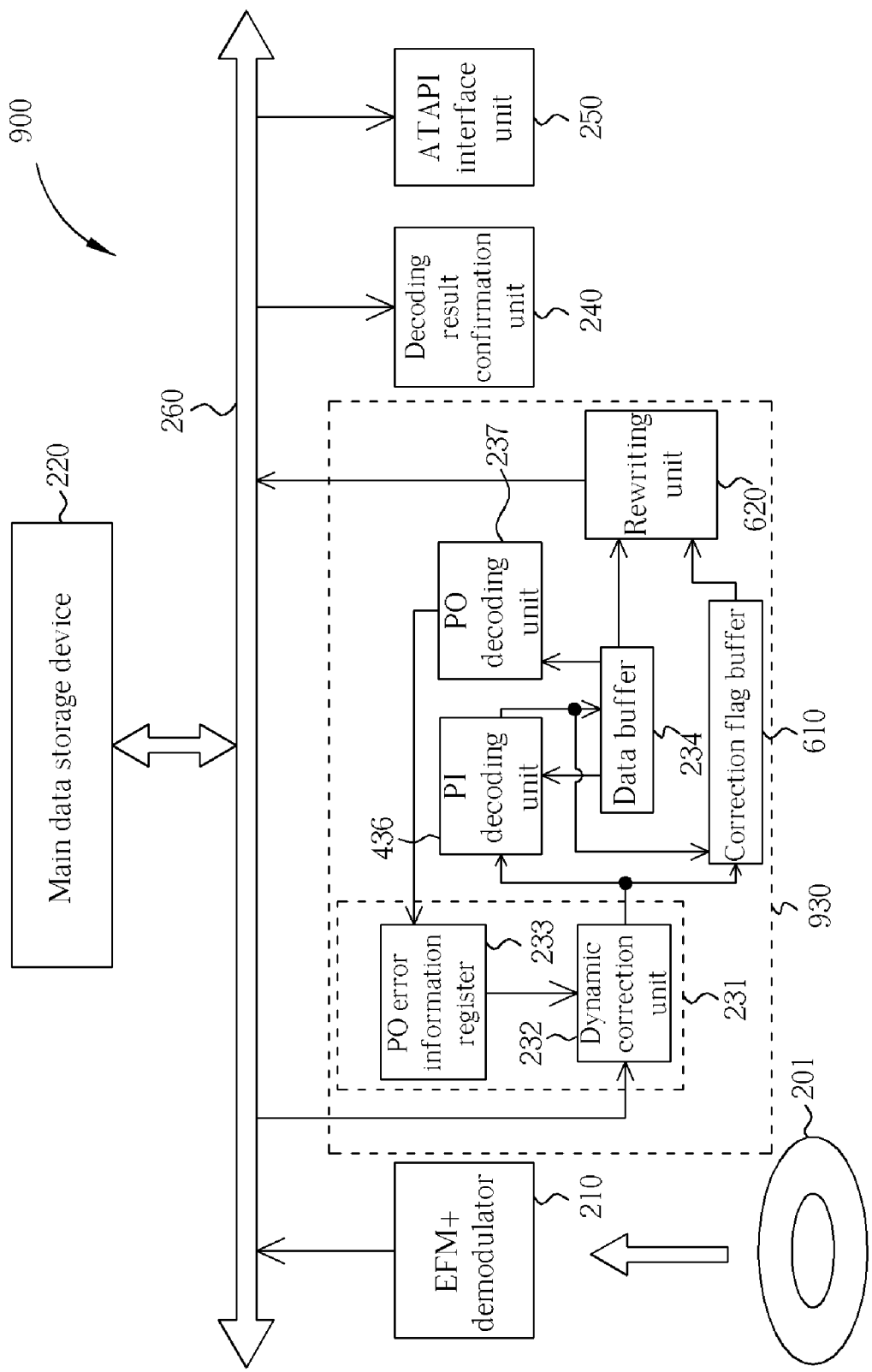
FIG. 9 is a block diagram of the DVD playback system having a decoding device according to the fifth embodiment of the present invention.
Figure 10:
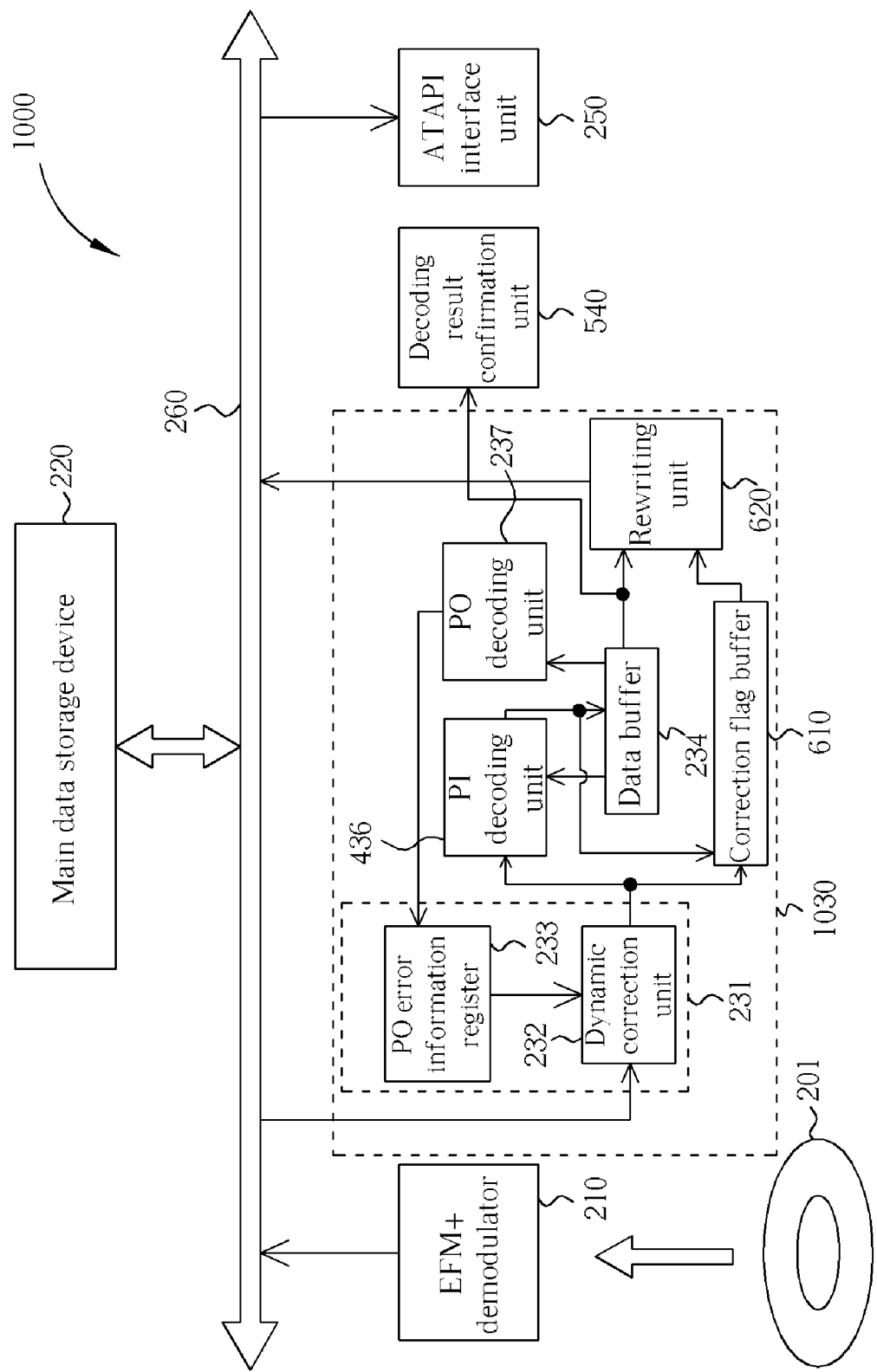
FIG. 10 is a block diagram of the DVD playback system having a decoding device according to the sixth embodiment of the present invention.

Please refer to FIG. 9 and FIG. 10: FIG. 9 is a block diagram of the DVD playback system 900 including a decoding device 930 according to the fifth embodiment of the present invention; FIG. 10 is a block diagram of the DVD playback system 1000 including a decoding device 1030 according to the sixth embodiment of the present invention. Please note that, since the same name elements of the DVD playback system 900 and 400 shown in FIG. 9 and FIG. 4 have the same function and operation, and the elements of the same name of the DVD playback system 1000 and 500 shown in FIG. 10 and FIG. 5 have the same function and operation, detailed description is omitted for the sake of brevity. In contrast to the DVD playback system 400, the DVD playback system 900 sets the above-mentioned correction flag buffer 610 and rewriting unit 620 in the decoding device 930. Similarly, in contrast to the DVD playback system 500, the DVD playback system 1000 sets the above-mentioned correction flag buffer 610 and rewriting unit 620 in the decoding device 1030.

In contrast to the related art, the decoding devices of the present invention and the related decoding methods process the error correction to each error data according to the error correction information of the PO direction during reception of a plurality of un-decoded data according to the PI direction. Thus this invention resolves the problem of a conventional error correction process where the PO direction is required to access the main data storage device randomly. That is, the decoding devices and the decoding methods of the present invention improve the efficiency of the main data storage device. Moreover, the decoding devices and the decoding methods of the present invention are able to determine the rewriting mode according to the quantity of data error. Thus the bandwidth distribution flexibility of the main data storage device is greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoding device for processing an uncorrected data in a data storage medium, the uncorrected data comprising a first direction error data and a second direction error data, the decoding device comprising:
    an error correction unit, receiving the uncorrected data, for correcting the second direction error data of the uncorrected data according to a second direction decoding information and outputting a data;
    a data buffer, coupled to the error correction unit, for buffering the data and outputting a corrected data after the first direction error data of the data is corrected;
    a first decoding unit, coupled to the data buffer, for decoding and correcting the first direction error data of the data stored in the data buffer; and
    a second decoding unit, coupled to the data buffer and the error correction unit, for generating the second direction decoding information to the error correction unit according to the data stored in the data buffer.

2. The decoding device of claim 1, wherein the error correction unit comprises:
    a register, receiving the second direction decoding information, for storing the second direction error data and a memory address of the second direction error data; and
    a dynamic correction unit for correcting the uncorrected data according to the second direction error data and the memory address of the second direction error data stored in the register.

3. The decoding device of claim 1, wherein the data buffer is coupled to a detecting unit, and the detecting unit is utilized for checking the corrected data outputted from the data buffer.

4. The decoding device of claim 1, further comprising:
    a flag buffer, coupled to the first decoding unit, for storing a flag signal; and
    a rewriting unit, coupled to the data buffer, the flag buffer and the data storage medium, for determining a rewriting mode of the data storage medium according to the data of the data buffer and the flag signal of the flag buffer.

5. The decoding device of claim 4, wherein the rewriting unit comprises:
    a rewriting buffer for storing an error data, which is ready to be rewritten into the data storage medium, and storing a memory location of the storage medium corresponding to the error data;
    a counter for counting the memory location of the data storage medium; and
    a switch module, coupled to the rewriting buffer and the counter, for controlling the error data and the memory location to store in the rewriting buffer.

6. The decoding device of claim 4, wherein the rewriting unit comprises:
    a rewriting buffer for storing an error data, which is ready to be rewritten to the data storage medium, and storing a memory location of the storage medium corresponding to the error data;
    an encoder, coupled to the rewriting buffer, for generating the memory location according to the flag signal and writing the memory location to the rewriting buffer;
    a data fetch unit, coupled to the encoder and the rewriting buffer, for outputting the error data according to the memory location outputted by the encoder.

7. The decoding device of claim 1, wherein the data buffer is coupled to a detecting unit, and the detecting unit is utilized for checking the corrected data outputted from the data buffer.

8. The decoding device of claim 1, wherein the first direction error data is an inner-code parity direction error data; and the second direction error data is an outer-code parity direction data.

9. A decoding device for processing an uncorrected data in a data storage medium, the uncorrected data comprising a first direction error data and a second direction error data, the decoding device comprising:
    an error correction unit, receiving the uncorrected data, for correcting the second direction error data of the uncorrected data according to a second direction decoding information and outputting a data;
    a first decoding unit, coupled to the error correction unit, for decoding the first direction error data of the data to output a first data;
    a data buffer, coupled to the first decoding unit, for buffering the first data and outputting a corrected data after the first direction error data of the first data is corrected; and
    a second decoding unit, coupled to the data buffer and the error correction unit, for generating the second direction decoding information to the error correction unit according to the first data stored in the data buffer.

10. The decoding device of claim 9, wherein the error correction unit comprises:
    a register, receiving the second direction decoding information, for storing the second direction error data and a memory address of the second direction error data; and
    a dynamic correction unit for correcting the uncorrected data according to the second direction error data and the memory address of the second direction error data stored in the register.

11. The decoding device of claim 9, further comprising:
    a flag buffer, coupled to the first decoding unit, for storing a flag signal; and
    a rewriting unit, coupled to the data buffer, the flag buffer and the data storage medium, for determining a rewriting mode of the data storage medium according to the data of the data buffer and the flag signal of the flag buffer.

12. The decoding device of claim 11, wherein the rewriting unit comprises:

a rewriting buffer for storing an error data, which is ready to be rewritten into the data storage medium, and storing a memory location of the storage medium corresponding to the error data;
   a counter for counting the memory location of the data storage medium; and
   a switch module, coupled to the rewriting buffer and the counter, for controlling the error data and the memory location to store in the rewriting buffer.

13. The decoding device of claim 11, wherein the rewriting unit comprises:
   a rewriting buffer for storing an error data, which is ready to be rewritten into the data storage medium, and storing a memory location of the storage medium corresponding to the error data;
   an encoder, coupled to the rewriting buffer, for generating the memory location according to the flag signal and writing the memory location to the rewriting buffer;
   a data fetch unit, coupled to the encoder and the rewriting buffer, for outputting the error data according to the memory location outputted by the encoder.

14. The decoding device of claim 9, wherein the data buffer is coupled to a detecting unit, and the detecting unit is utilized for checking the corrected data outputted from the data buffer.

15. The decoding device of claim 9, wherein the first direction error data is an inner-code parity direction error data; and the second direction error data is an outer-code parity direction data.

16. A decoding method for processing an uncorrected data in a data storage medium, comprising:
   receiving the uncorrected data according to a first direction of the data medium and storing the uncorrected data into a buffer;
   correcting a first direction error of the uncorrected data stored in the buffer according to a first direction decoding and correction information, and generating a second direction decoding and correction information to an error correction unit;
   receiving the uncorrected data to the error correction unit according to the first direction of the data storage medium, and correcting a second direction error of the uncorrected data according to the second direction decoding and correction information; and
   checking whether the first and second direction error of the uncorrected data are corrected.

17. The decoding method of claim 16, further comprising:
   generating a first direction flag to a rewriting unit according to the uncorrected data to determine the rewriting mode of rewriting the uncorrected data to the data storage medium.

18. The decoding method of claim 16, wherein the second direction decoding and correction information comprises a second direction error value and a memory location of the second direction error value.

19. The decoding method of claim 16, wherein the first direction error is an inner-code parity direction error data; and the second direction error is an outer-code parity direction data.

* * * * *